(12) United States Patent
De Haas et al.

(10) Patent No.: US 11,263,452 B2
(45) Date of Patent: Mar. 1, 2022

(54) METHOD AND DEVICE FOR DETECTING AN INVENTORY IN A STORAGE SPACE

(71) Applicant: Opticon Sensors Europe B.V., Hoofddorp (NL)

(72) Inventors: Dick De Haas, Hoofddorp (NL); Rudi Groeneveld, Hoofddorp (NL); Pieter Abraham Maarten Anemaet, Hoofddorp (NL); Pascal Krijnberg, Hoofddorp (NL)

(73) Assignee: Opticon Sensors Europe B.V., Hoofddorp (NL)

( * ) Notice: Subject to any disclaimer, the term of this patent is extended or adjusted under 35 U.S.C. 154(b) by 63 days.

(21) Appl. No.: 16/070,474

(22) PCT Filed: Jan. 16, 2017

(86) PCT No.: PCT/NL2017/050021
§ 371 (c)(1),
(2) Date: Jul. 16, 2018

(87) PCT Pub. No.: WO2017/123093
PCT Pub. Date: Jul. 20, 2017

(65) Prior Publication Data
US 2021/0201022 A1   Jul. 1, 2021

(30) Foreign Application Priority Data
Jan. 14, 2016 (NL) ..................................... 2016099

(51) Int. Cl.
*G06K 9/00* (2006.01)
*G06K 9/46* (2006.01)
*G06Q 10/08* (2012.01)

(52) U.S. Cl.
CPC ....... *G06K 9/00624* (2013.01); *G06K 9/4647* (2013.01); *G06Q 10/087* (2013.01)

(58) Field of Classification Search
CPC .... G06K 9/00624; G06K 9/4647; G06K 7/10; G06K 7/1443; G06Q 10/087; G06Q 20/203; G06Q 40/0283
(Continued)

(56) References Cited

U.S. PATENT DOCUMENTS 7,546,952 B2 * 6/2009 Knowles ................. A47F 9/046
                                                    235/462.42
7,841,533 B2 * 11/2010 Kotlarsky .......... G06K 7/10821
                                                    235/462.24
(Continued)

FOREIGN PATENT DOCUMENTS

EP            2838054 A3 *  4/2015  ........... G06K 9/6263
WO      2009/027839 A2     3/2009
WO     WO-2009027839 A2 *  3/2009  ......... G06K 9/00201

OTHER PUBLICATIONS

Authorized Officer: De Smet, Michael, International Search Report and Written Opinion issued in counterpart PCT application No. PCT/NL2017/050021, dated Feb. 24, 2017.

*Primary Examiner* — Mahendra R Patel
(74) *Attorney, Agent, or Firm* — Kaplan Breyer Schwarz, LLP

(57) ABSTRACT

Various aspects relate to a method of detecting an inventory in a storage space. The method comprises acquiring an image comprising image data depicting at least part of the storage space and determining, for at least an area of the image, at least one product inventory area. Next, it is detected whether the image data comprised by the image area has a transition of intensity above a pre-determined threshold within a pre-determined distance. Based on the outcome of the detection, it is determined a product is present in the product inventory area if the transition of intensity within the pre-determined distance is detected. Using edge detection, no comparison of subsequently acquired images is required. If an edge is detected, a product is determined to be present on a particular location on the shelf. This determination may be executed based on one single image, rather than on two consecutively acquired images.

12 Claims, 3 Drawing Sheets

(58) Field of Classification Search
USPC ........................................................ 382/103
See application file for complete search history.

(56) References Cited

U.S. PATENT DOCUMENTS

| | | | |
|---|---|---|---|
| 8,438,084 B1* | 5/2013 | Tesler | G06Q 10/087 |
| | | | 705/29 |
| 8,941,645 B2* | 1/2015 | Grimaud | G06T 7/001 |
| | | | 345/419 |
| 9,558,405 B2* | 1/2017 | Leong | G06K 9/6201 |
| 10,013,834 B2* | 7/2018 | Phillips | G07C 9/28 |
| 10,083,243 B2* | 9/2018 | Cypher | G06F 3/04847 |
| 10,147,210 B1* | 12/2018 | Desai | G06K 9/00228 |
| 10,217,307 B2* | 2/2019 | Phillips | G06F 3/0486 |
| 10,282,695 B1* | 5/2019 | McNamara | G06Q 10/087 |
| 10,339,411 B1* | 7/2019 | Hua | G06K 9/00214 |
| 10,504,073 B2* | 12/2019 | Atsmon | G07D 7/12 |
| 10,810,540 B1* | 10/2020 | Gopal | G01G 19/387 |
| 11,117,744 B1* | 9/2021 | Medioni | G05B 15/02 |
| 2009/0212112 A1* | 8/2009 | Li | G06K 7/10 |
| | | | 235/462.12 |
| 2015/0262116 A1* | 9/2015 | Katircioglu | G06K 9/00771 |
| | | | 705/28 |
| 2016/0342937 A1* | 11/2016 | Kerrick | G06Q 10/087 |

* cited by examiner

METHOD AND DEVICE FOR DETECTING AN INVENTORY IN A STORAGE SPACE

TECHNICAL FIELD

The various aspects relate to detection of products in a storage area, for example a shelf in a gondola in a shop, by means of image processing.

BACKGROUND

Various methods of detecting stock on a shelf in a shop have been disclosed. Some documents disclose use of NFC identifiers. This requires NFC tags on products.

Other documents disclose comparing two images that have been acquired in sequence. If a difference is detected, it is determined stock of products on the shelf has changed. This technology requires storage and comparison of images. Using comparison of images for detecting change in stock requires time to pass between acquisition of two images. This may result in change of ambient parameters, like lighting. This, in turn, may influence the detection process.

SUMMARY

It is preferred to provide improved inventory detection.

A first aspect provides a method of detecting an inventory in a storage space. The method comprises acquiring an image comprising image data depicting at least part of the storage space and determining, for at least an area of the image, at least one product inventory area. Next, it is detected whether the image data comprised by the image area has a transition of intensity above a pre-determined threshold within a pre-determined distance. Based on the outcome of the detection, it is determined a product is present in the product inventory area if the transition of intensity within the pre-determined distance is detected.

Using edge detection, no comparison of subsequently acquired images is required, as no detection of any edge—sharp transition of image data—indicates no product is present at a particular location on a shelf—as an example of a storage space. If an edge is detected, a product is determined to be present in the product inventory area, for example a particular location on the shelf. This determination may be executed based on one single image, rather than on two or more consecutively acquired images.

An embodiment of the first aspect further comprises determining, for at least an area of the image, multiple product inventory areas and detecting and determining, for each product inventory area, whether a product is present. Based on the outcome of detecting and determining, an amount of products present in the storage space determined.

This embodiment allows keeping administration of an inventory, based on actual inventory.

In another embodiment of the first, aspect, comprising information indicating an amount of products present in the storage space is provided to a visualisation module for visualising the information.

This embodiment provides convenience to customers as well as shopkeepers, as inventory may be checked at one particular location. This is particularly convenient in case of products being stored on a deep shelf with limited height available.

In a further embodiment, the area of the image for which at least one product inventory area is determined is smaller than the total image. This reduces the amount of data to be processed.

A second aspect provides a device for detecting an inventory in a storage space. The device comprises a shelf providing a storage space, a camera for acquiring an image comprising image data depicting at least part of the storage space; and a processing unit. The processing unit is arranged to determine, for at least an area of the image, at least one product inventory area, detect whether the image data comprised by the image area has a transition of intensity above a pre-determined threshold within a pre-determined distance; and determine a product is present in the product inventory area if the transition of intensity within the pre-determined distance is detected.

A third aspect provides a computer programme product instructions executable by a computer causing the computer to execute the method according to the first aspect.

BRIEF DESCRIPTION OF THE DRAWINGS

The various aspects and embodiments thereof will now be discussed in further detail. In the drawings.

DETAILED DESCRIPTION

Figure 1:
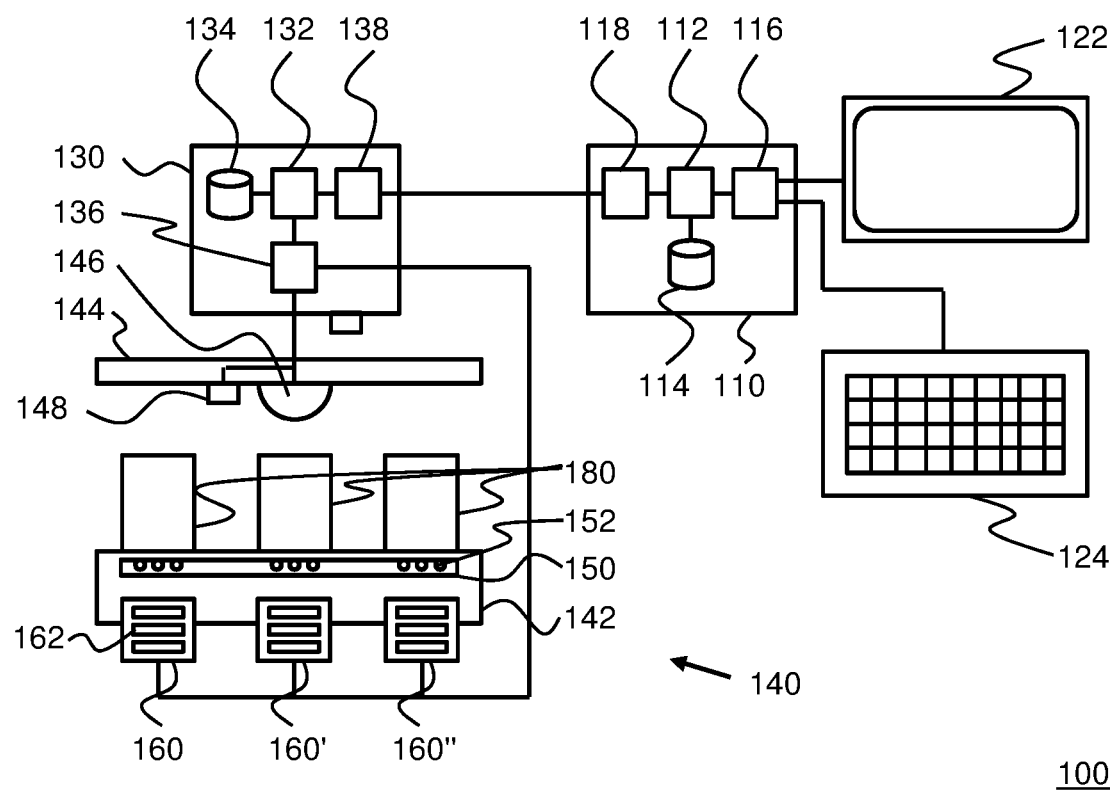
FIG. 1 shows an inventory detection and management system 100.

FIG. 1 shows an inventory detection and management system 100. The system 100 comprises a central server 110 for receiving and processing of data related to an inventory. The server 110 comprises a server processing unit 112 for controlling operation of the server 110 and components thereof. The server 110 further comprises a server storage unit 114, a server communication unit 118 and an server input/output unit 116. The server storage unit 114 is arranged for storing data received by the server communication unit 118 and the server input/output unit 116 and for storing computer executable instructions for programming the server processing unit 112. To the server 110 and the server input/output unit 116 in particular, a screen 122 and a keyboard 124 as an input module are connected. Additionally or alternatively to the keyboard 124, also other input/output devices may be employed, like a mouse, a microphone, a camera and/or a touch screen.

FIG. 1 further shows a shelf system controller 130. The shelf system controller 130 comprises a controller processing unit 132 for controlling operation of the controller 130 and components thereof. The controller 130 further comprises a controller storage unit 134, a controller communication unit 138 and an controller input/output unit 136. The controller storage unit 134 is arranged for storing data received by the controller communication unit 138 and the controller input/output unit 136 and for storing computer executable instructions for programming the controller processing unit 132. The controller 130 is coupled to the server 110 via the server communication unit 118 and the controller communication unit 138.

The controller 130 is connected to a shelf system 140 via the controller input/output unit 136. The shelf system 140 comprises an upper shelf 144 and a lower shelf 142. At the bottom of the upper shelf 144, a camera 146 is connected. The camera 146 preferably has a wide angle lens, also known as a fisheye lens. The camera 136 is connected to the controller input/output unit 136. Alternatively or additionally, the shelf system 140 may comprise multiple cameras connected to the controller input/output unit 136.

The lower shelf 142 serves as a support for products 180 and in that way, provides a storage space for storing the products 180. In the embodiment shown by FIG. 1, the products 180 are lined up in three lines. The lower shelf 142 is provided with an illumination module 150 comprising one or more illumination units 152. In the embodiment shown by FIG. 1, the illumination units 152 are LED modules. At each line of products 180, three illumination units 152 are provided on the illumination module 150. Alternatively, one illumination module 150 is provided per line of products 180. In this embodiment, the illumination module 150 is integrated in the lower shelf 142. The lower shelf 142 is provided with a translucent window that lets light pass from the illumination module 150 to the products 180 for illuminating the products 180.

For each line of products 180, an inventory display 160 is provided. The inventory display 160 comprises multiple inventory indicators 162. In this embodiment, the inventory indicators 162 are bar indicators 162. The amount of bars illuminated and/or a colour of the bars may provide an indication of the amount of products 180 in a line. Alternatively or additionally, the inventory display 160 may comprise an alphanumeric display or a full pixel-based graphic display. The inventory displays 160 are connected to the controller 130 and to the controller input/output unit 136 in particular.

Figure 2:
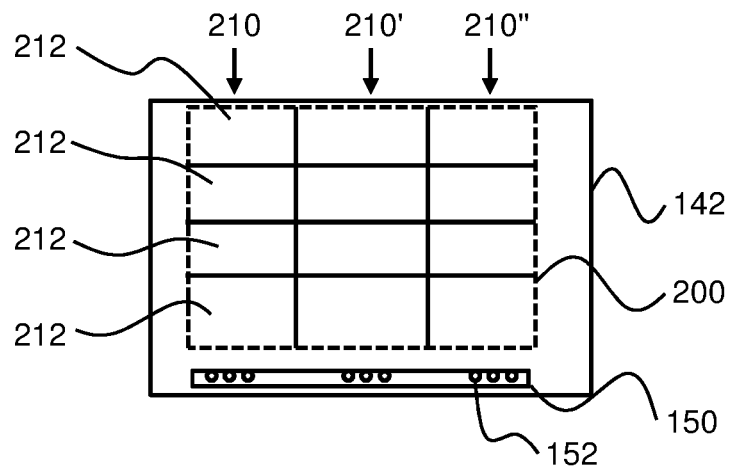
FIG. 2A: shows a top view of a product storage space.
FIG. 2B: shows another top view of a product storage space.
Figure 2:
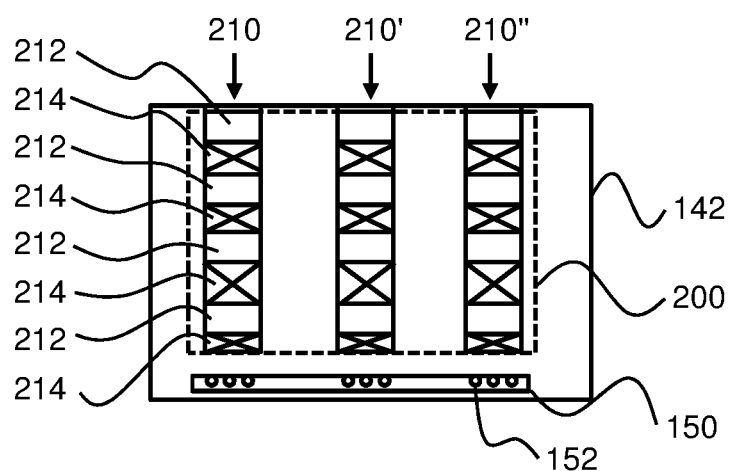

FIG. 2A shows a top view of the lower shelf 132, indicating the storage space provided for the products 180. Also the illumination module 150 is indicated. The storage space is monitored by the camera 146. The monitoring may be continuous by capturing a stream of images covering at least a part and preferably all or at least most of the storage space. Alternatively, separate images are captured. In FIG. 2, a monitored area 200 is indicated by a dashed line. In this embodiment, using a fisheye lens with the camera 136, the monitored area 200 is captured by the camera 136 in one shot.

In the monitored area 200 and with that, in each image captured by the camera 136, a first product lane 210, a second product lane 210' and a third product lane 210" are defined. Each product lane corresponds to line of products 180 as depicted by FIG. 1. Within each product line, product inventory areas 212 are defined. The product inventory areas 212 correspond to location where products 180 may be stored. In this embodiment, spacing between centres of the product inventory areas 212 are, within a product lane, spaced apart by a size of a product 180—or a little more.

Figure 3:
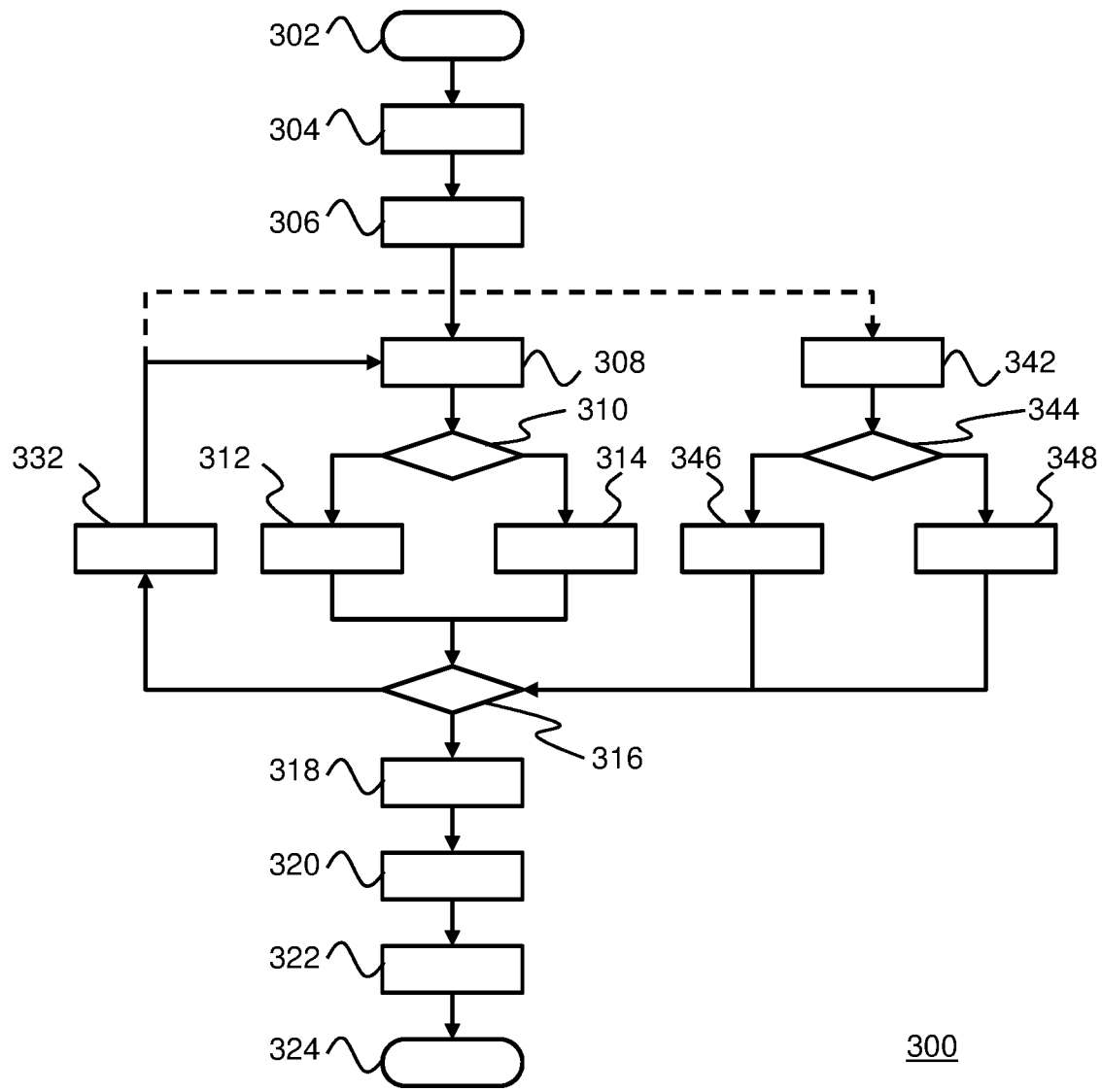
FIG. 3 shows a flowchart

For each product inventory area 212, presence of a product 180 may be detected. This will be discussed in further detail in conjunction with a flowchart 300 depicted by FIG. 3. In the list below, short summaries of the various elements of the flowchart 300 are provided. The various steps of the flowchart 300 are preferably executed by the controller 130.

| | |
|---|---|
| 302 | start procedure |
| 304 | acquire image |
| 306 | determine inventory areas |
| 308 | detect edges in inventory area |
| 310 | edge detected? |
| 312 | product presence detected |
| 314 | no product presence detected |
| 316 | all inventory areas in image done? |
| 318 | determine amount of products detected |
| 320 | generate display data |

-continued

| | |
|---|---|
| 322 | display data |
| 324 | end procedure |
| 332 | move to next inventory area |
| 342 | compare image intensity to reference |
| 344 | difference with reference detected? |
| 346 | product presence detected |
| 348 | no product presence detected |

The procedure starts in a terminator 302 and subsequently moves to step 304 in which an image of the monitored area 200 is acquired. The image is a digital image comprising pixel data. For each pixel of the captured image, at least one intensity value is provided. This allows acquiring a monochrome image. Additionally, at least two more intensity values may be acquired, allowing capturing a colour image. In this case, intensity value may relate to intensity of red, green and blue light. Within the monitored area 200, inventory areas 212 are determined in step 306. The actual locations of the inventory areas 212 are preferably defined upfront. These inventory areas 212 are preferably adjustable to allow flexibility with respect to the type of products 180 stored on the lower shelf 142.

The monitored area 200 may be divided in contiguous inventory areas 212, as depicted by FIG. 2A. Alternatively, the monitored area 200 may be divided in non-contiguous inventory areas 212, as depicted by FIG. 2B. FIG. 2B shows non-adjacent product lanes, divided in non-adjacent inventory areas 212. Also with the embodiment as depicted by FIG. 2B, each inventory areas 212 corresponds to an intended location of a product 180. In yet another alternative embodiment, the inventory areas 212 are not pre-defined, but determined while assessing a captured image.

Step 306 is preferably followed by step 308, in which edges are detected in an inventory area 212. Alternatively, step 306 is followed by step 342, which will be discussed later. Edge detection implies image data related to a specific inventory area 212 is assessed to determine whether pixel intensity data changes with a value or with values exceeding a particular threshold, within a particular distance. The change in intensity is determined relatively simply for a monochrome image. For a colour image, the change in intensity may be determined for one, more or all intensity values. The particular distance may be defined in terms of pixels or in terms of actual distance on within the monitored area 200.

Based on the assessment in step 308, a decision is made in step 310 whether an edge is detected in a particular inventory area 212 or not. If an edge is detected in the particular inventory area 212, the process branches to step 312, in which it is determined product presence is detected in the particular inventory area 212. If no edge is detected in the particular inventory area 212, the process branches to step 314, in which it is determined no product presence is detected in the particular inventory area 212. To improve product detection by means of edge detection, the inventory areas 212 are preferably, but not necessarily, defined such that with a particular intended placement of a product 180 at least partially in the inventory area 212, such that within the inventory area 212, at least an edge of the product 180 is provided.

Following either one of the determination steps, the process checks in decision 316 whether all inventory areas 212 in the captured image of the monitored area 200 have been assessed. If this is not the case, the process branches back to step 308, while moving the assessment to a next inventory area 212. If data has been assessed for all inventory areas, the process continues to step 318, which an amount of detected products 180 is determined. This determination is based on the amount of products 180 detected.

In step 320, display data is generated. The display data is generated based on the amount of detected products. If the inventory display 160 comprises the bar indicators 162 and if a particular product lane comprises four inventory areas 212, the display data may be generated as follows: no bar illuminated with no products in the product lane, one bar illuminated with one product in the product lane, two bars illuminated with two products in the product lane and three bars illuminated with three or four products in the product lane. Alternatively, in an embodiment in which colours of the bar indicators 162 may be changed, the display data may be defined as follows: one bar illuminated red with no products in the product lane, two bars illuminated yellow or orange with on product in the product lane and three bars illuminated green with two to four products in the product lane. If the inventory display 160 is an (alpha)numeric display, the display data may indicate the actual number of detected products 180. If the inventory display 160 is a graphical display, many options are available for generating display data for reflecting an amount of products 180 available in a product lane. In case of presenting different colours, also only one bar or other figure may be provided in the inventory display 160. As the amount of products on the lower shelf 142 is usually well visible by a person in front of the lower shelf 142, generation and display of the display data are optional steps.

In step 322, the display data is displayed on the inventory display 160 corresponding to a particular product lane. Subsequently, the process ends in a terminator 324. With multiple product lanes, the procedure 300 may be run again for another product lane.

As indicated, the process may also branch off to step 342, following step 306 in which inventory areas are determined within an image captured from the monitored area 200. In step 342, intensity of at least a part of pixels for a particular inventory area 212 is compared to a reference intensity. Each individual intensity value of each individual pixel may be combined or an average intensity value of multiple pixels may be compared in step 342. If the determined value is above or below the reference intensity, optionally taken into account a relative or absolute margin, preferably pre-defined, presence of a product is detected in the inventory area 212 is detected in in step 346. If the determined value is not above or below the reference intensity, optionally taken into account a relative or absolute margin, preferably pre-defined, no presence of a product is detected in the inventory area 212 is detected in in step 348.

For this type of detection of presence of a product 180 within the monitored area 200, and to a lesser extent for the edge detection of detection of presence of a product 180, proper illumination of products 180 within the monitored area 200 is supportive. Therefore, the amount of light provided by the illumination module 150 may preferably be adapted. In such embodiment, the amount of light provided by the illumination module 150 is preferably dependent on ambient light available within the monitored area 200. The amount of available light may be obtained by means of a light sensor 148. If the amount of light is not sufficient for reliable detection of the presence of products 180, the intensity of light provided by the illumination module 160 may be increased in response to the detection of insufficient light.

Following either one of the determination steps, the process checks in decision 316 whether all inventory areas 212 in the captured image of the monitored area 200 have been assessed. If this is not the case, the process branches back to step 342, while moving the assessment to a next inventory area 212. If data has been assessed for all inventory areas, the process continues to step 318, and continues as discussed above.

Whereas in the embodiments discussed above the lower shelf 142 is only discussed as comprising the illumination module 150 and having the inventory display 160 attached to it, the lower shelf 142 may also serve as an upper shelf for a storage space that may be provided below the lower shelf 142. Likewise, the upper shelf 144 may be provided with one or more illumination modules and inventory displays, upon which the upper shelf 144 may serve as a storage space.

The amount of products 180 determined, per monitored area 200 or per product lane 210, may be stored in the controller storage unit 134. Additionally or alternatively, the data may be sent to the central server 110 via the controller communication unit 138 and the server communication unit 118. This may be sent by means of a wired or wireless connection. In the central server 110, the data may be stored in the server storage unit 114. In the server 110, data from multiple controllers like the controller 130 discussed may be processed. In this way, server 100 may be used for monitoring an inventory of an entire shop. This enables checking the full and actual inventory via the screen 122, enabling navigation by means of the keyboard 124. With this information available, additional products may be ordered in time, such that always an adequate number of products 180 is available on the shelves, not too much and not too few.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa. When data is being referred to as audiovisual data, it can represent audio only, video only or still pictures only or a combination thereof, unless specifically indicated otherwise in the description of the embodiments.

In the description above, it will be understood that when an element such as layer, region or substrate is referred to as being "on" or "onto" another element, the element is either directly on the other element, or intervening elements may also be present.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method of detecting an inventory in a storage space, the method comprising:
   Acquiring an image comprising image data depicting at least part of the storage space;

Determining, for at least an area of the image, at least one product inventory area;

Detecting whether the image data comprised by the image area has a transition of intensity above a pre-determined threshold within a pre-determined distance;

Determine a product is present in the product inventory area if the transition of intensity within the pre-determined distance is detected;

Generating a signal comprising information indicating an amount of products present in the storage space;

Providing the information to a visualisation module and visualising the information, wherein visualising comprises as least one of the following:

Providing a first indicator having a first color if the determined amount of products is equal to or above a pre-determined threshold and providing second indicator having a second color if the determined amount of products is below the pre-determined threshold; and Providing a first number of third indicators if the determined amount of products is equal to or above a pre-determined threshold and providing a second number of third indicators if the determined amount of products is below the pre-determined threshold.

2. The method according to claim 1, further comprising detecting whether the image data comprised by image area has substantially the same intensity;

Determining the product inventory area is empty if the image data comprised by image area has substantially the same intensity.

3. The method according to claim 1, further comprising:

Determining, for at least an area of the image, multiple product inventory areas; Detecting and determining, for each product inventory area, whether a product is present; and Determining, based on the outcome of detecting and determining, an amount of products present in the storage space.

4. The method according to claim 1, wherein visualising comprises a showing a number corresponding to the determined amount of products.

5. The method according to claim 1, wherein the area of the image for which at least one product inventory area is determined is smaller than the total image.

6. The method according to claim 3, wherein determining multiple product inventory areas comprises defining substantially rectangular non-adjacent product inventory areas.

7. The method according to claim 6, wherein the locations of the rectangular non-adjacent product inventory areas coincide at least partially with intended locations of products to be placed in the storage space.

8. A device for detecting an inventory in a storage space, the device comprising:

A shelf providing a storage space;

A camera for acquiring an image comprising image data depicting at least part of the storage space; and A processing unit arranged to:

Determine, for at least an area of the image, at least one product inventory area; Detect whether the image data comprised by the image area has a transition of intensity above a pre-determined threshold within a pre-determined distance; and Determine a product is present in the product inventory area if the transition of intensity within the pre-determined distance is detected;

Generate a signal comprising information indicating an amount of products present in the storage space;

Provide the information to a visualization module to visualize the information, wherein the visualization module is arranged to provide as least one of the following:

A first indicator having a first color if the determined amount of products is equal to or above a pre-determined threshold and provide second indicator having a second color if the determined amount of products is below the pre-determined threshold; and A first number of third indicators if the determined amount of products is equal to or above a pre-determined threshold and provide a second number of third indicators if the determined amount of products is below the pre-determined threshold.

9. The device according to claim 8, wherein the camera comprises a fish-eye lens.

10. The device according to claim 8, further comprising a visualisation module for visualisation of information indicating an amount of products present in the storage space.

11. The device according to claim 8, further comprising a lighting source for illuminating products for which the shelf is arranged to hold such products.

12. A computer programme product comprising instructions executable by a computer causing the computer to execute the method according to claim 1.

* * * * *